United States Patent [19]

Neth

[11] 4,298,305
[45] Nov. 3, 1981

[54] METHOD AND APPARATUS FOR TRANSFERRING LOADS

[75] Inventor: Walter Neth, Vancouver, Wash.

[73] Assignee: Columbia Machine, Inc., Vancouver, Wash.

[21] Appl. No.: 962,888

[22] Filed: Nov. 22, 1978

[51] Int. Cl.³ .............................................. B60P 1/64
[52] U.S. Cl. ..................................... 414/498; 104/37; 104/39; 414/154; 414/180; 414/608
[58] Field of Search ............... 414/277, 279, 282, 284, 414/498, 608, 154, 180, 341, 26 A, 239–241, 244–246, 253, 259, 921; 104/35, 36, 37, 39, 48, 50, 44

[56] References Cited

U.S. PATENT DOCUMENTS

| | | | |
|---|---|---|---|
| 1,797,325 | 3/1931 | Chaudoir | 414/253 |
| 3,212,654 | 10/1965 | Dolphin | 414/341 |
| 3,255,899 | 6/1966 | Mengel | 104/44 X |
| 3,797,678 | 3/1974 | Richardson | 414/284 |
| 3,800,963 | 4/1974 | Holland | 414/279 |
| 4,026,387 | 5/1977 | Abreu | 414/921 X |
| 4,142,641 | 3/1979 | Dake | 414/921 X |
| 4,166,546 | 9/1979 | English | 414/246 X |

Primary Examiner—Trygve M. Blix
Assistant Examiner—Edmond G. Rishell, Jr.
Attorney, Agent, or Firm—Kolisch, Hartwell & Dickinson

[57] ABSTRACT

A method and apparatus for transferring loads between selected stations includes a transfer car operable for selective shifting along a predetermined path interposed between first and second stations and a load carrier mounted on the transfer car operable for reciprocative shifting relative to the transfer car from a pre-spot position to load receiving and depositing positions. An orienting device such as a turntable is positioned adjacent the predetermined path and is operable for selectively rotating the transfer car and the load carrier through a predetermined angular displacement.

20 Claims, 19 Drawing Figures

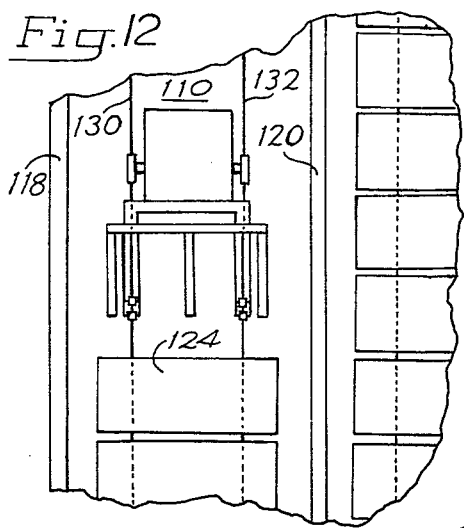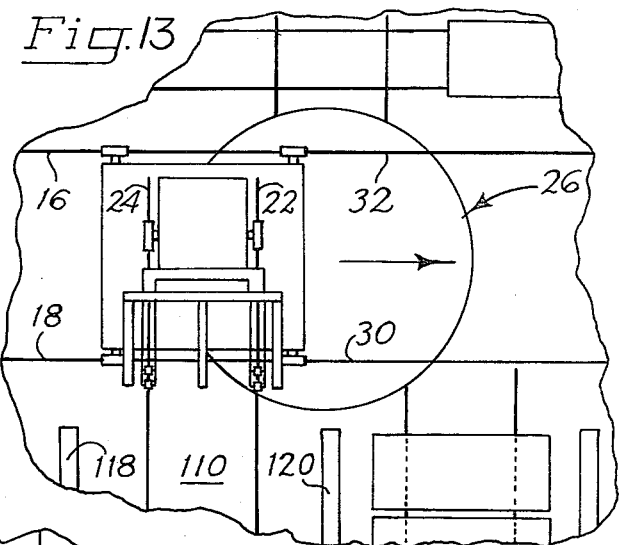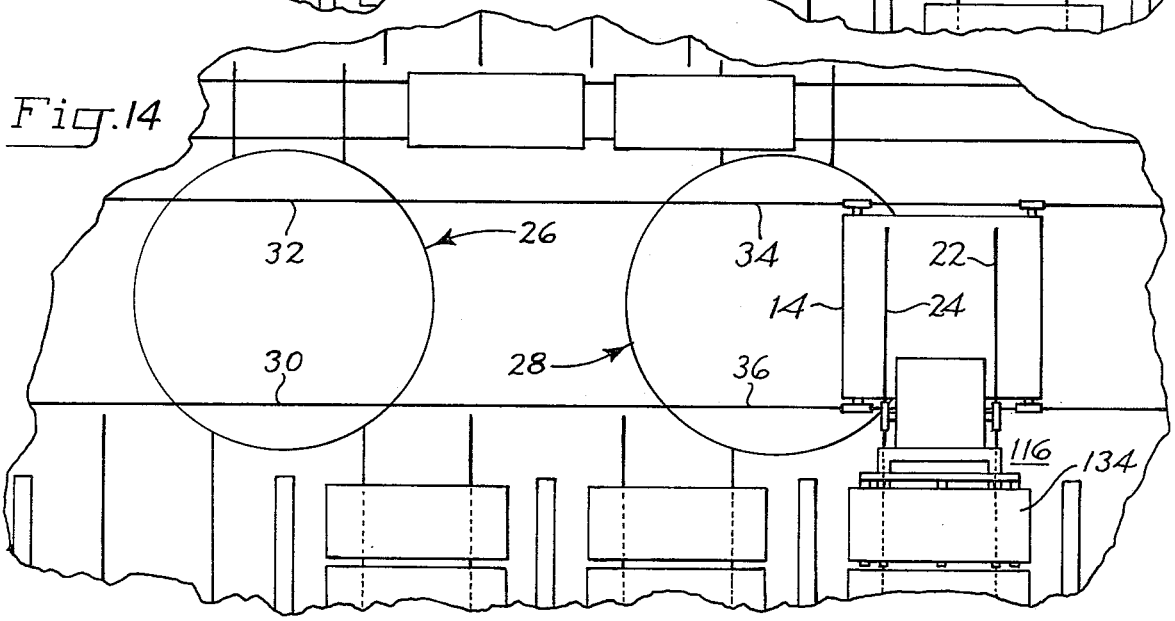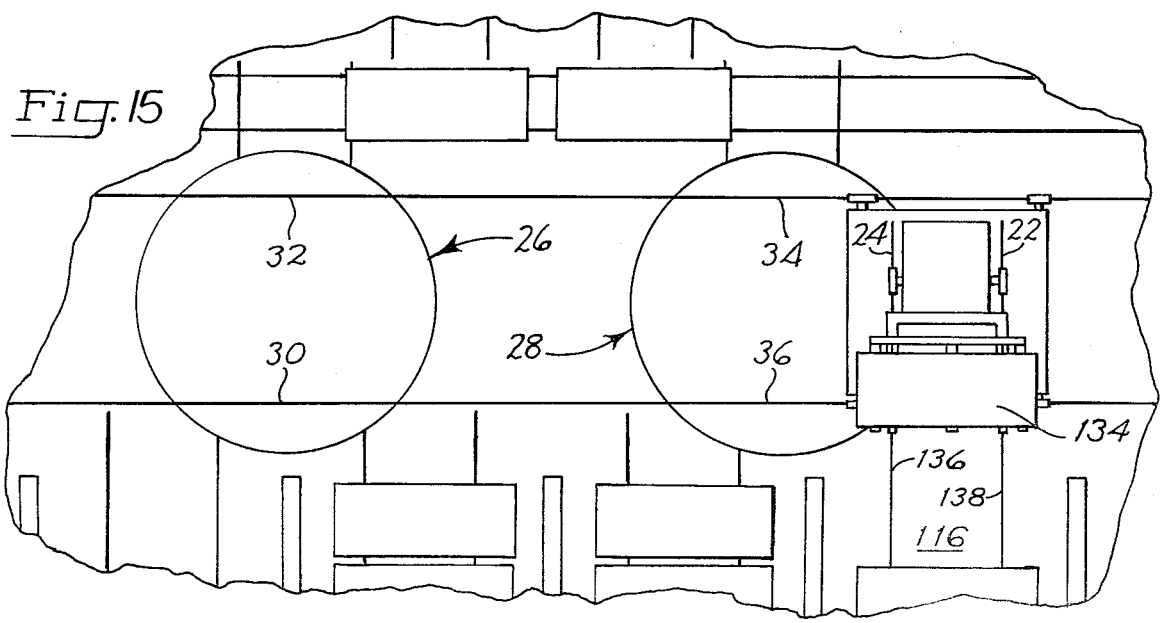

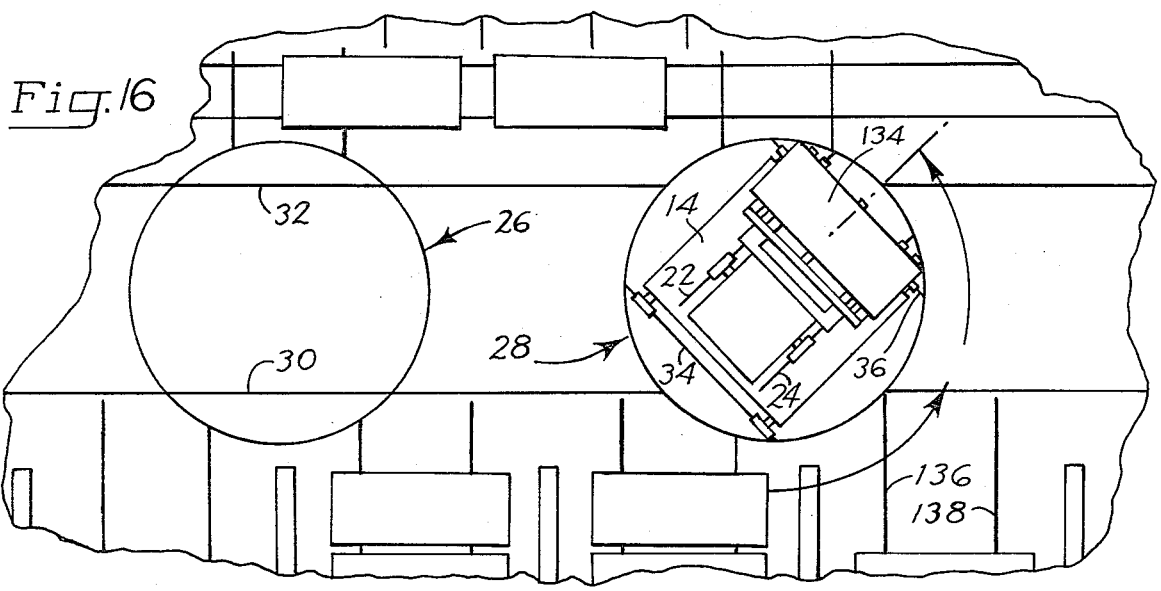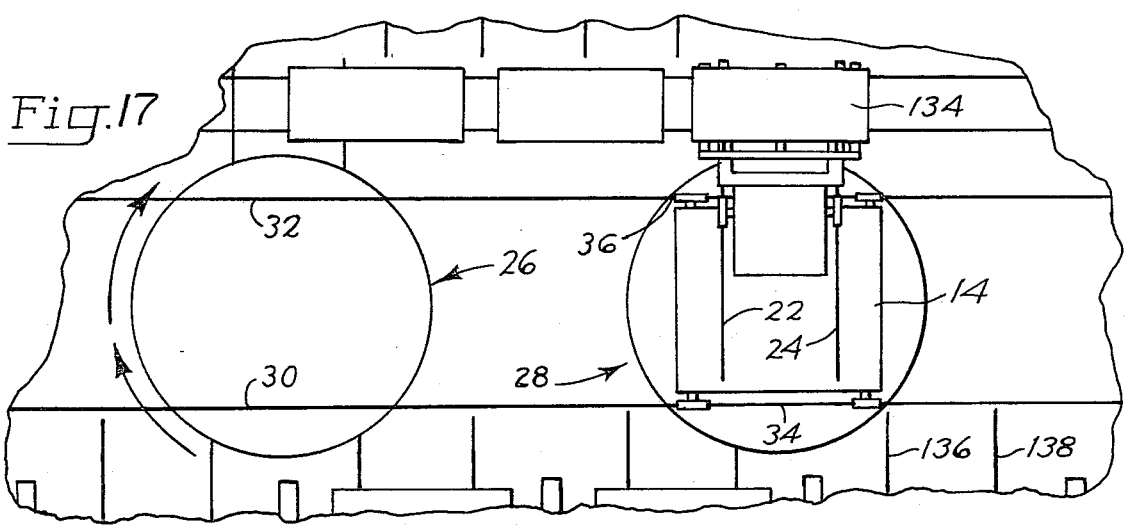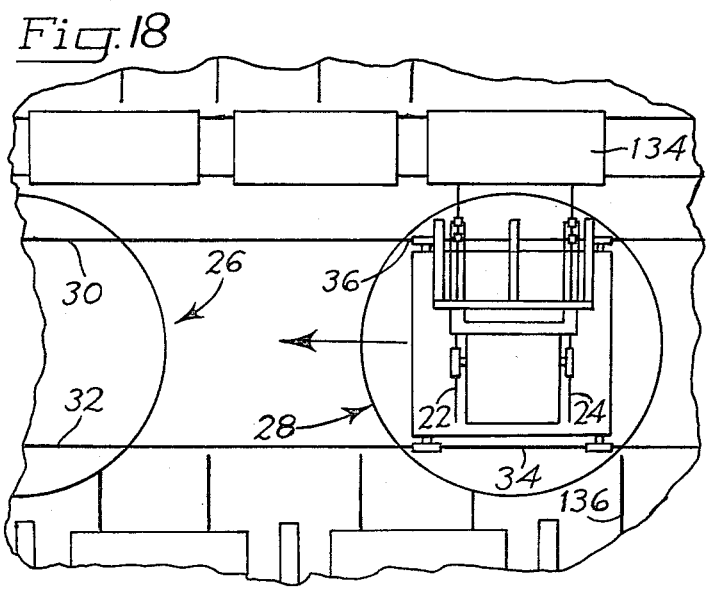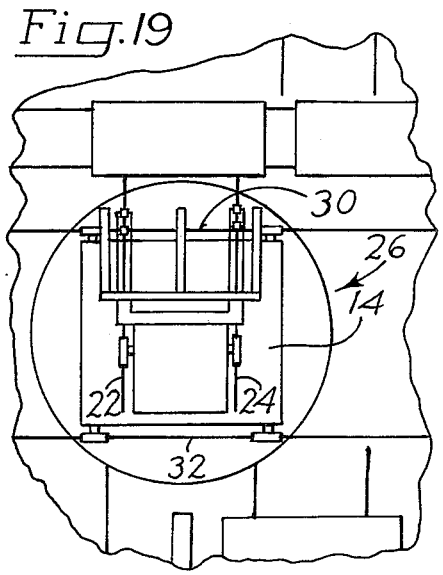

METHOD AND APPARATUS FOR TRANSFERRING LOADS

BACKGROUND AND SUMMARY OF THE INVENTION

The present invention relates to systems for handling and transferring loads and more particularly to a novel method and apparatus for facilitating transfer of loads such as concrete blocks between a block machine, a kiln and an unloading station.

In the manufacture of concrete blocks, it is conventional to produce the blocks in a block machine, group or batch them on a rack and then transport the blocks to a kiln. After curing, racks are transported to an unloading station. Typical kilns include elongate bays separated from one another by kiln walls, each of the bays accommodating a plurality of racks. It can be appreciated that considerable time and effort are required to remove racks from the block making machine, transport them to selected bays in the kiln and, after curing, remove the racks for discharge to an unloading station.

A typical form of block processing plant might include a block machine which is positioned adjacent a kiln having a selected number of bays. After manufacture of blocks, they are transferred to selected bays and, after curing, they are removed from an end of the bays and transferred via another conveyor to an unloading station. A problem resides in the fact that considerable conveying equipment may be necessary and automation may be difficult to provide.

Accordingly, it is a general object of the present invention is to provide a method and apparatus for facilitating automatic transferring of a load, such as a rack of concrete blocks from a loading station to a kiln and, after curing, to an unloading station. The apparatus includes a transfer car means operable for selective shifting along a predetermined path interposed between stations such as the loading station, kiln and unloading station. A load carrier means is mounted on the transfer car means and is operable for selective shifting relative to the transfer car means from a pre-spot position to load receiving and discharging positions. An orienting means such as a turntable is positioned adjacent the predetermined path and is operable for selectively rotating the transfer car means and the load carrier means through a predetermined angular displacement.

Thus, in operation in one preferred embodiment, the transfer car means is positioned on a first turntable with the load carrier means in a pre-spot position. The load carrier means is shifted relative to the transfer car means toward the loading station for receiving the load, such as a rack of concrete blocks. After receiving the load, the load carrier means is returned to its pre-spot position and the turntable is suitably rotated a predetermined angular displacement of say, 180°, so that the load is presented to face a kiln on the opposite side of the predetermined path. The transfer car means may then be shifted away from the turntable so that it is positioned in front of a second station such as a selected kiln bay. The load carrier means is then shifted along guide means provided on the transfer car means onto rails provided in the selected kiln bay so that the load may be deposited in the selected bay. After depositing the load, the load carrier means is returned to the transfer car means to the pre-spot position, the transfer car means shifted to the other side of the turntable and to a position adjacent another kiln bay. The load carrier means is shifted from the transfer car means for receiving a rack of, for instance, cured blocks, and then returned to the transfer car means for shifting to a second turntable for angular displacement so that the load is presented to an unloading station.

Another object of the present invention is to provide an apparatus, as described above, in which the load carrier means includes a forklift vehicle movable relative to the transfer car means for receiving and discharging a load. The forklift vehicle includes stabilizing members extending forwardly of the mast assembly for eliminating need for any counterweight on the vehicle. Additionally, the present invention contemplates that each stabilizing member will be provided, at their forward ends, with rockable wheel pairs mounted in tandem relation for facilitating transfer from the guide means on the transfer car means to the rails in a selected kiln bay.

Still another object of the present invention is to provide an apparatus which utilizes a pair of turntables each of which includes power-driven means coupled thereto operable for selectively imparting rotation to the turntable through a predetermined angular displacement. The predetermined angular displacement will result in selectively positioning a pair of laterally opposed track means on each turntable in either alignment or nonalignment with tracks or guides which define the predetermined path.

These and additional objects and advantages of the present invention will be more readily understood from a consideration of the drawings and the following detailed description of the preferred embodiment.

BRIEF DESCRIPTION OF THE DRAWINGS

FIGS. 12 and 13 are views similar to FIG. 11 illustrating depositing of the rack and return of the load carrier means to its pre-spot position on the transfer car means;

FIG. 14 is a view similar to FIG. 13 illustrating shifting of the transfer car means along the predetermined path to a position beyond the second turntable for locating the load carrier means in alignment with rails in another kiln bay;

FIG. 15 is a view similar to FIG. 14 illustrating return of the load carrier means with a rack of cured blocks from the kiln bay to its pre-spot position on the transfer car means;

FIG. 16 is a view similar to FIG. 15 illustrating positioning of the transfer car means on the second turntable means with rotation of the second turntable in a counterclockwise direction;

FIG. 17 is a view similar to FIG. 16 illustrating completion of rotation of 180° and shifting of the load carrier means into position for depositing the rack onto an unloading conveyor;

FIG. 18 is a view similar to FIG. 17 illustrating return of the load carrier means after depositing the rack on the unloading conveyor; and FIG. 19 is a view similar to FIG. 18 illustrating return of the transfer car means to the first turntable with the load carrier means in its pre-spot position preparatory for receiving another rack.

DETAILED DESCRIPTION OF THE PREFERRED EMBODIMENT

Figure 1:
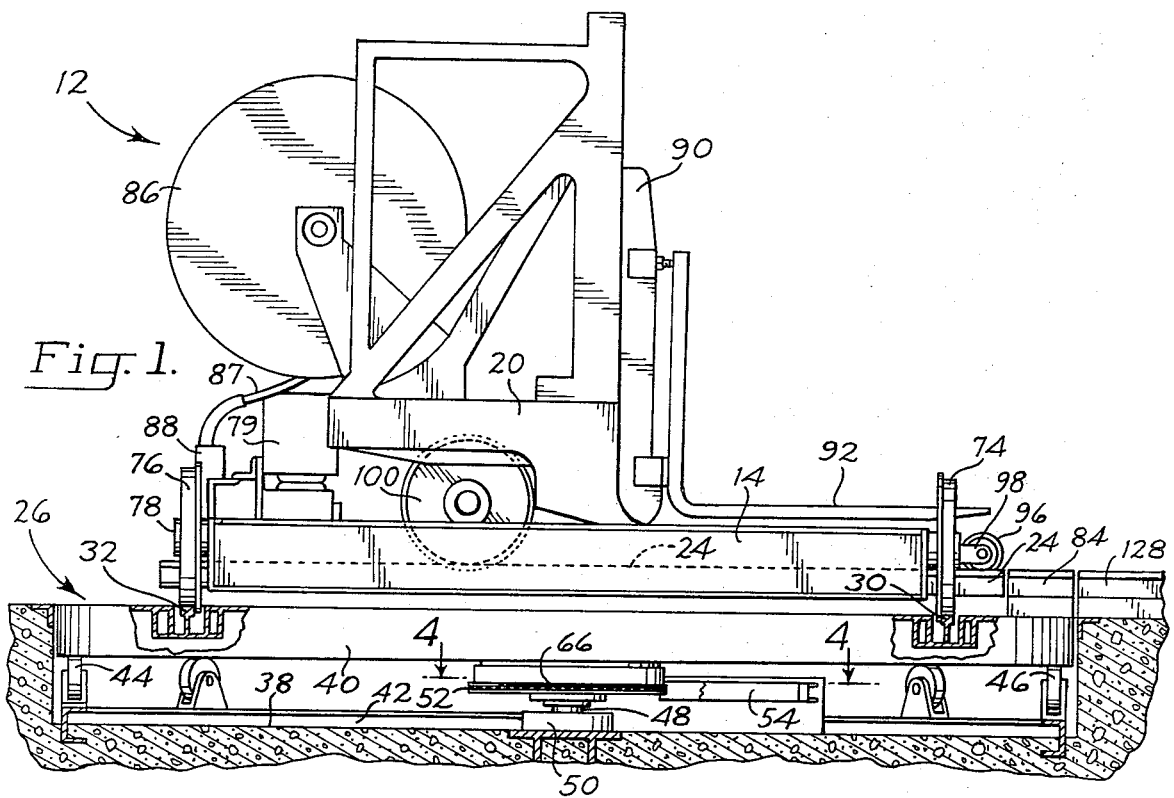
FIG. 1 is a side elevation view illustrating the apparatus of the present invention including a load carrier means mounted on a transfer car means, which in turn, is mounted on a turntable in a pre-spot position.

As mentioned previously, the present invention is directed to a method and apparatus for transferring a load between selected stations and includes a transfer car means, a load carrier means and orienting means such as turntables. The general concept of the present invention may initially be appreciated from a consideration of FIGS. 1 and 5 taken together. Specifically, as can be seen from a consideration of FIG. 5, apparatus according to the present invention is generally designated at 10 and includes a handling means generally indicated at 12. The handling means includes a transfer car means 14 operable for selectively shifting along a predetermined path defined by laterally opposed rails or tracks 16, 18. Further, handling means 12 includes a load carrier means 20 which is suitably mounted for nonpermanent assembly on guide means 22, 24 provided on transfer car means 14.

Figure 5:
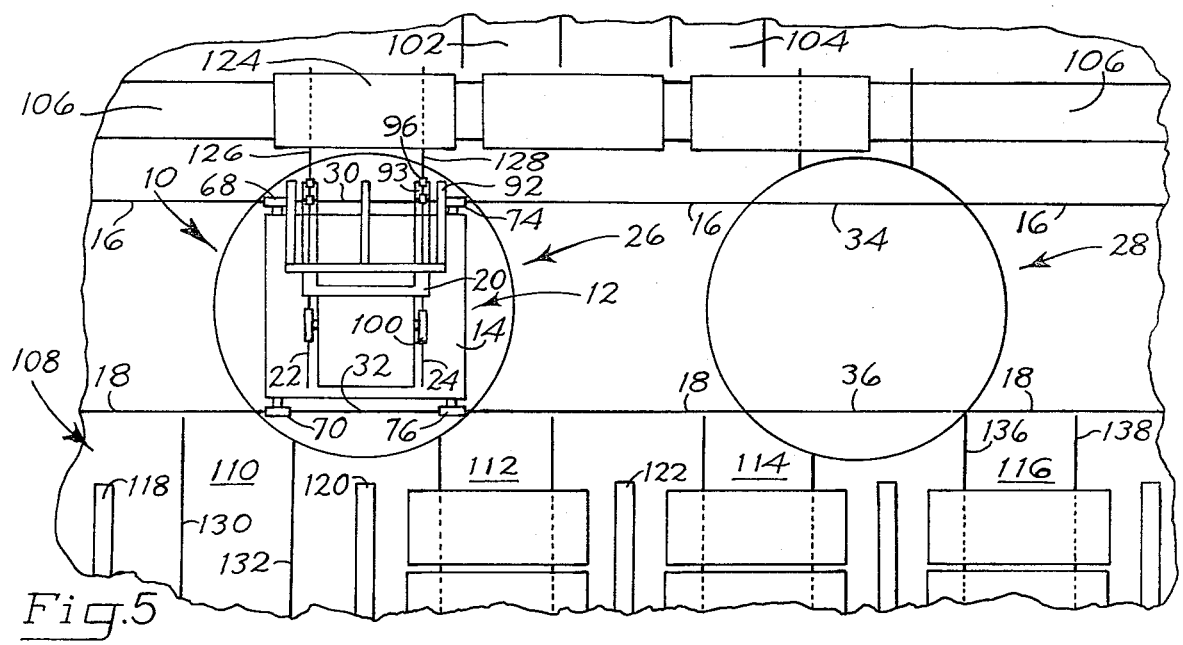
FIG. 5 is top plan view, shown schematically, of the apparatus of the present invention including a pair of turntables positioned along a predetermined path between kiln bays and loading and unloading stations, the transfer car means and load carrier means being positioned prior to receiving a rack of concrete blocks.

As can also be seen from a consideration of FIG. 5, a pair of orienting means such as turntables 26, 28 are positioned adjacent the predetermined path and each are provided with power-driven means coupled thereto operable for selectively rotating an associated turntable through a predetermined angular displacement. It is also to be noted that turntable 26 is provided with a pair of laterally opposed tracks 30, 32 for receiving transfer car means 14. As will be described later, turntable 26 is rotatable through a predetermined angular displacement to selectively align tracks 30, 32 with tracks 16, 18, respectively. Similarly, turntable 28 is provided with tracks 34, 36 also selectively alignable, upon suitable rotation of the turntable, with tracks 16, 18, respectively.

Considering further details of apparatus 10, reference is now directed to FIG. 1 which illustrates in side elevation view handling means 12 mounted on turntable 26. Turntable 26 is mounted within a pit 38 and includes a circular upper section 40 mounted for rotation above a circular and stationary lower section 42. Roller means, only two of which are shown at 44, 46 support upper section 40 above lower section 42 for facilitating relative rotatable movement therebetween. Further, a central rotatable shaft indicated at 48 is suitably journaled to a mounting 50 secured to the bottom of pit 38. Extending upwardly from the shaft is a power-transmission means, such as a sheave or gear wheel 52 suitably secured to a bottom of upper section 40. As can be seen from a consideration of FIG. 4, power transmission means is coaxially aligned relative to turntable 26 and is connected to a power-driven means such as fluid actuated means including a pair of extendible-retractable means mounted on opposite sides of the transmission means and coupled thereto operable for extension and retraction in opposition to one another for imparting rotation, in a like sense, to the transmission means and upper section 40.

Figure 4:
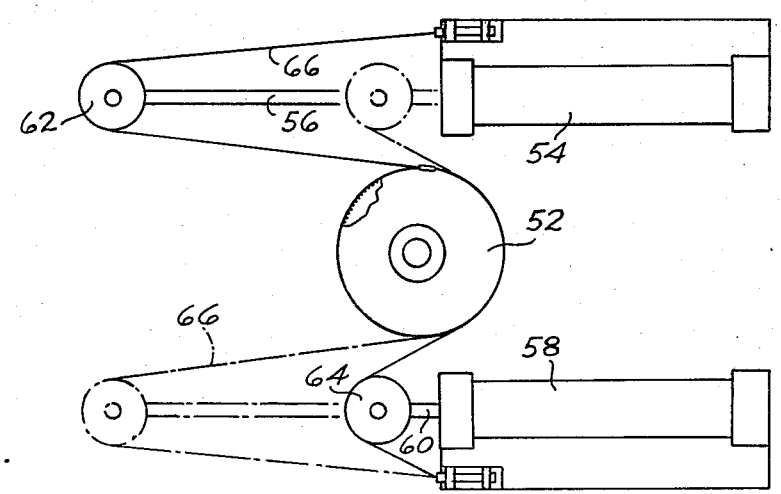
FIG. 4 is an enlarged view of a power-driven means including transmission means for selectively rotating a turntable.

As shown in FIG. 4, a first fluid actuated cylinder 54 provided with a rod 56 is mounted on one side of power transmission means 52 and another fluid-actuated cylinder 58 provided with rod 60 is mounted on the other side. Each of the rods includes a rotatable sheave mounted at one end thereof such as indicated at 62 on rod 56 and 64 on rod 60. Trained around sheaves 52, 62 and 64 is an elongate flexible drive such as a leaf chain 66 suitably mounted at its opposite ends to secured points adjacent the cylinders. Thus, with cylinders 54, 58 sequenced to operate for extending and retracting rods 56, 60 in opposition to one another, it may readily be appreciated that power transmission means 52, secured to upper section 40, will rotate so as to impart movement to the upper section. During rotation, upper section 40 will rotate along a substantially vertical axis with the upper surface of the upper section maintained substantially horizontal due to its being supported on lower section 42 by means of rollers 44, 46, etc.

Figure 3:
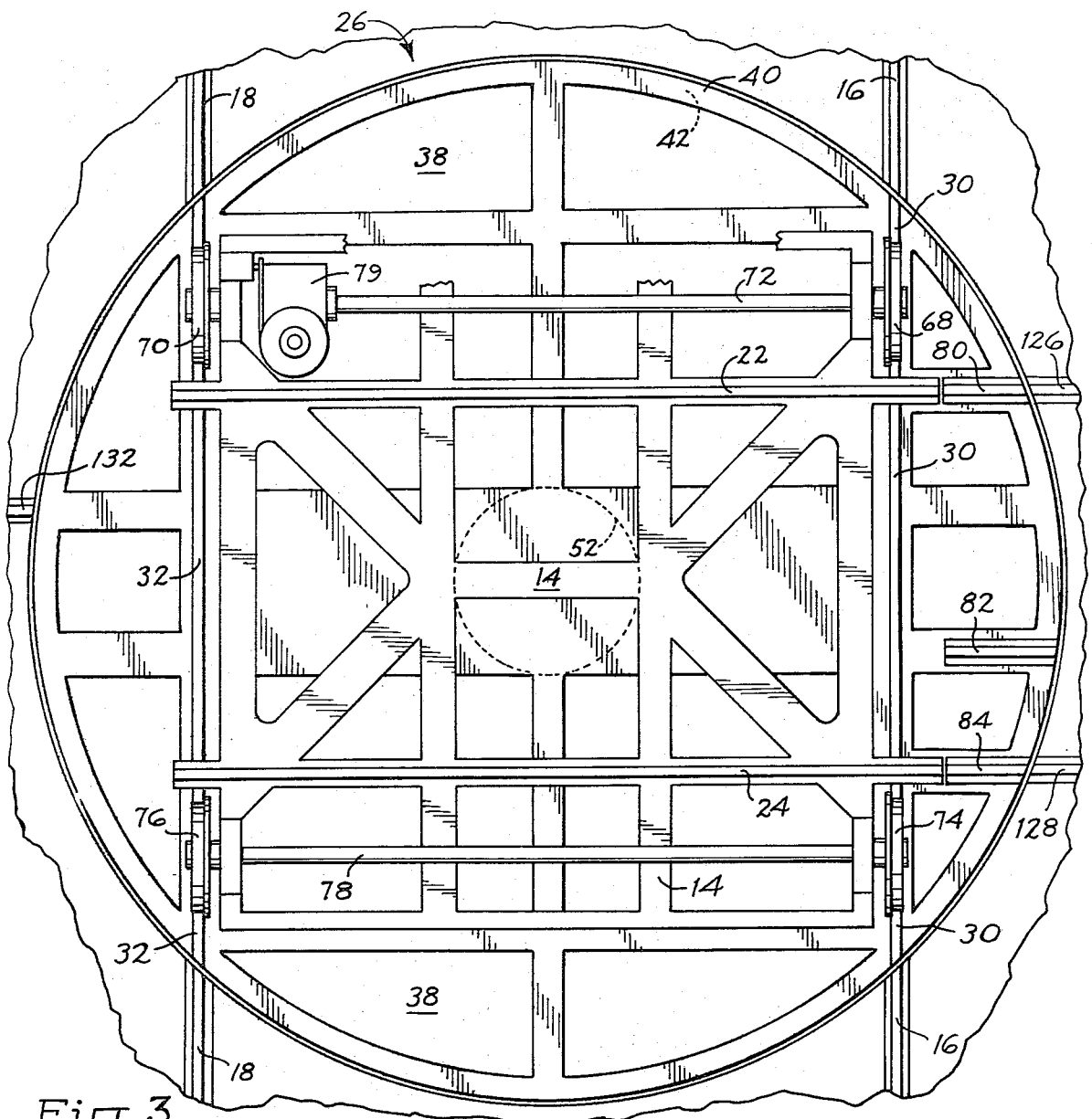
FIG. 3 is a top plan view, somewhat enlarged, showing mounting of the transfer car means (the load carrier means being deleted for purposes of clarity) on the turntable.

As can be seen from a consideration of FIG. 3, rails 30, 32 provided on turntable 26 are selectively alignable with rails 16, 18 of the predetermined path upon suitable orientation of the turntable. Transfer car means 14 is shown without load carrier means mounted thereon for purposes of clarity. As can be seen, transfer car means 14 is provided with a suitable rectangular frame construction for mounting opposed pairs of wheels. For instance, wheels 68, 70 are spaced apart a predetermined distance for riding on tracks 16, 18 and are secured together by an axle 72 mounted in opposed journal bearings. At the other end of transfer car means 14 wheels 74, 76 are mounted on an axle 78. A motor 79, such as an electric drive motor, is appropriately mounted for driving axle 72 and hence the transfer car means. As mentioned previously with respect to FIG. 5, transfer car means 14 is also provided with transversely extending guide means 22, 24 (such as rails) dimensioned for receiving load carrier means 20. It should also be appreciated that turntable 26 is provided with auxiliary tracks 80, 82 and 84. The auxiliary tracks are alignable with rails in the kiln bays in a manner to be described hereinafter. At this point, it is important to note that the spacing between guide means 22, 24 is equal to the spacing between auxiliary tracks 80, 84.

Returning now to FIG. 1, it can be seen that load carrier means 20 is shown in a pre-spot position on transfer car means 14. Load carrier means 20 is provided with a suitable frame structure for mounting a cable reel 86. Cable reel 86 is rotatably journaled and serves to reel in or pay out electrical cable from a junction box 88 mounted on transfer car means 14. Electric power from a power source (not shown) is connected to the junction box. As illustrated in FIG. 1, load carrier means 20 is preferably a forklift vehicle provided with a mast assembly 90 including a plurality of forks one of which is illustrated at 92. Additionally, the forward portion of load carrier means 20 is constructed with a pair of opposed spaced-apart stabilizing members one of which is illustrated at 93. Each of the stabilizing members is provided at a forward end thereof with pivotally mounted or rockable tandem wheels, 94, 96 suitably interconnected by means of a link means 98 (see FIG. 2). At a rear portion of load carrier means 20 there is provided a pair of spaced-apart rear wheels one of which is indicated at 100. The rear wheels are spaced-apart for suitable mounting on guide means 22, 24 as are the front, tandem wheels. The purpose of the stabilizing members is to eliminate the requirement of a counterweight on the rear of the load carrier means when a heavy load is supported on the fork.

Operation of the Load Transferring Apparatus

The following description will be directed to an outline of the method of the present invention which utilizes the apparatus as described above for transferring loads between selected stations and which includes the basic steps of shifting the handling means into a position adjacent a first station for receiving a load and then rotating the handling means with the load supported thereon through a predetermined angular displacement so that the handling means may be shifted into a position adjacent a second station for depositing the load. As this description continues, it will be understood that variations upon this basic method are readily achievable especially if a second turntable is provided as illustrated in FIG. 5.

Thus, with attention directed to FIG. 5, it can be seen that a first predetermined path, defined by rails 16, 18 interrupted by a pair of turntables 26, 28 is positioned between rack loader and unloader devices, generally indicated at 102, 104 respectively, a rack conveyor 106 and a kiln generally indicated at 108. The kiln, only a portion of which is illustrated, includes a plurality of bays 110, 112, 114, 116, etc. separated by walls such as indicated at 118, 120, 122, etc. Each of the bays is provided with a plurality of tracks defining second predetermined paths. The tracks are spaced-apart a distance equal to the spacing of guide means 22, 24 for receiving load carrier means 20 in a manner to be described hereinafter.

Initially, concrete blocks are fed from a block making machine (not shown) to rack loader 102 for loading a rack of concrete blocks. A load including a rack of concrete blocks is indicated schematically at 124 and has been shifted from rack loader 102 to a spotting position as illustrated. Turntable 26 is suitably positioned so that rails 30, 32 are aligned with rails 16, 18 and transfer car means 14 is positioned substantially centrally relative to turntable 26. Load carrier means 20 is positioned (by means of its own power source, not shown) in a pre-spot position on transfer car means 14 as shown in FIG. 5 preparatory to being shifted so that the forks may be positioned underneath rack 124. As shown in FIG. 5, suitable tracks such as indicated at 126, 128 extend beneath what corresponds to a first or loading station. Tracks 126, 128 are alignable with auxiliary tracks 80, 84 on turntable 26.

Figure 6:
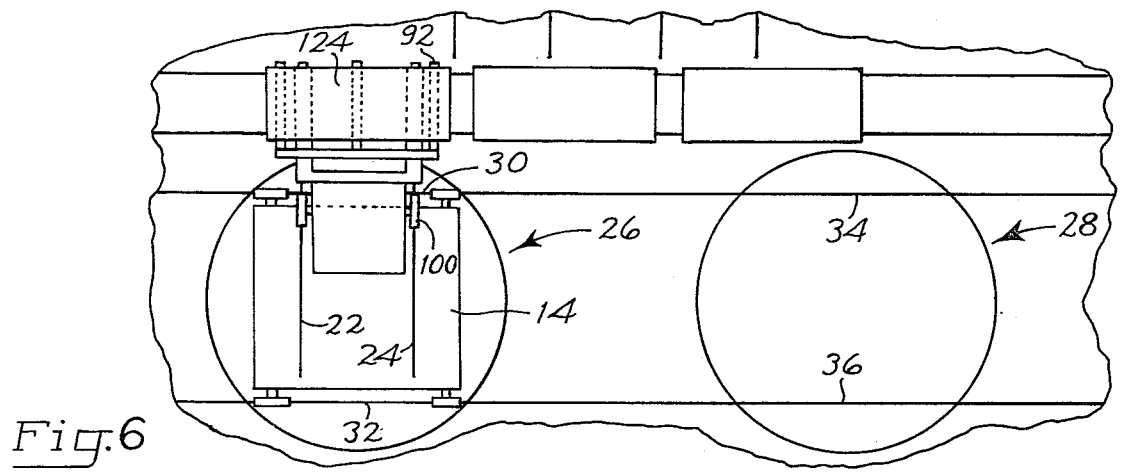
FIG. 6 is a view similar to FIG. 5 illustrating completed shifting of the load carrier means from its pre-spot position to a position for receiving a rack.
Figure 7:
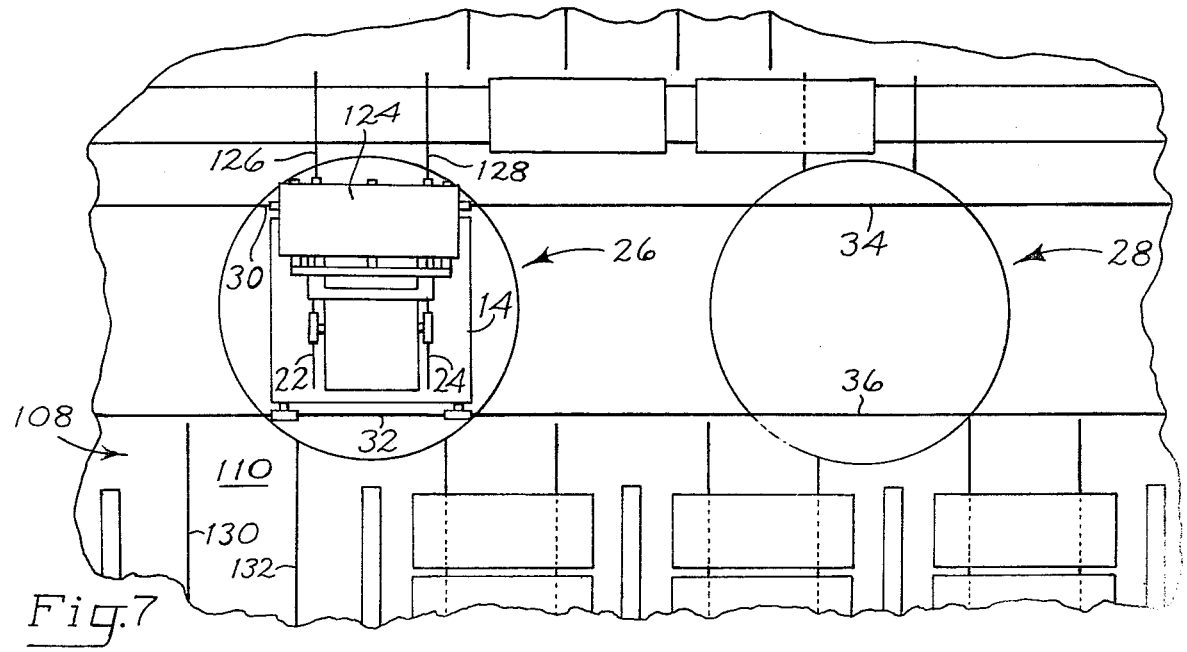
FIG. 7 is a view similar to FIG. 6 illustrating return of the load carrier means to its pre-spot position.
Figure 8:
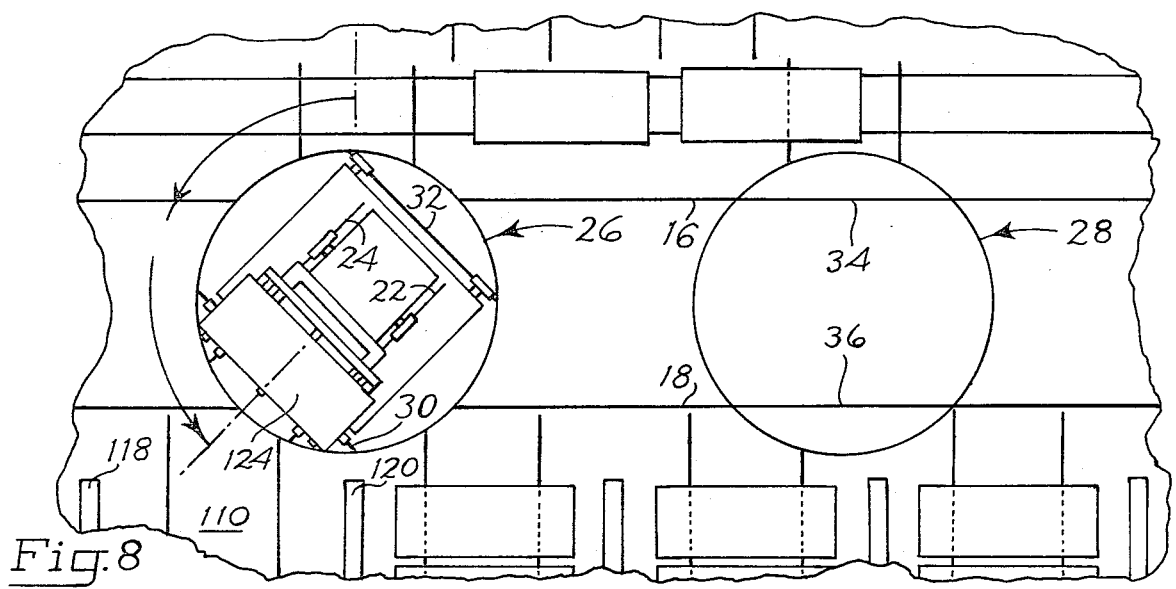
FIG. 8 is a view similar to FIG. 7 illustrating rotation of the first turntable partially through a predetermined angular displacement.

Considering FIG. 6, it can be seen that load carrier means 20 has been shifted from its pre-spot position to a position with its forks beneath rack 124. This is substantially the same position shown in FIG. 2 and the forks are elevated to lift rack 124 so that a plurality of legs of the rack, two of which are shown at 124a, 124b, are lifted from the surface of the rack conveyor. Next, as shown in FIG. 7, load carrier means 20 is shifted from its load receiving position back to its pre-spot position on transfer car means 14. By suitable actuation of the fluid actuated means, turntable 26 is reoriented or rotated (see FIG. 8) about a substantially vertical axis of rotation through a predetermined angular displacement.

Figure 9:
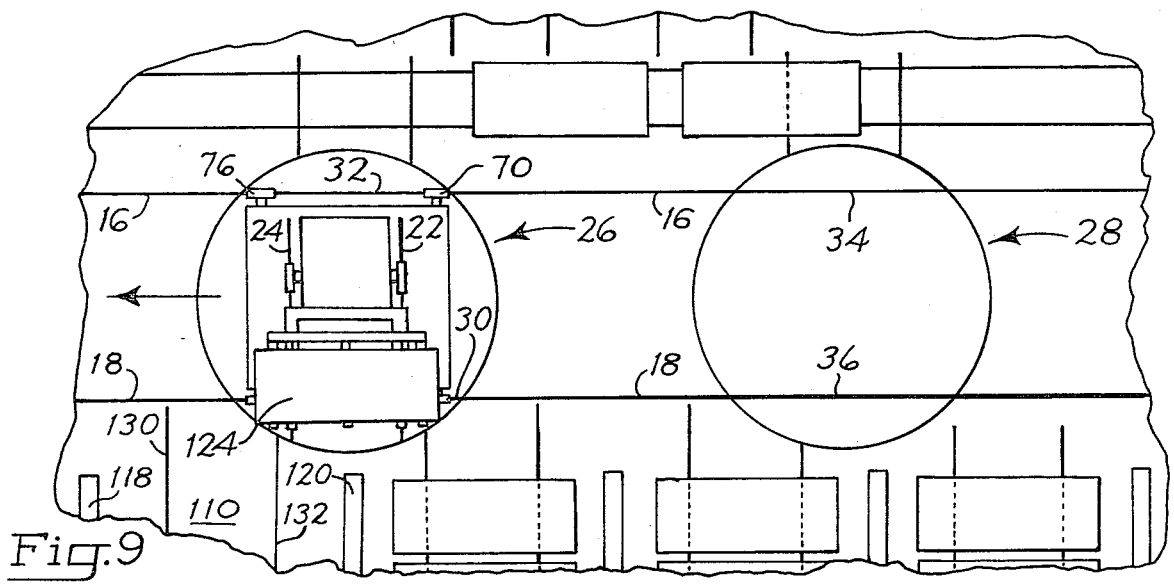
FIG. 9 is a view similar to FIG. 8 illustrating completed rotation of the turntable through 180°.
Figure 10:
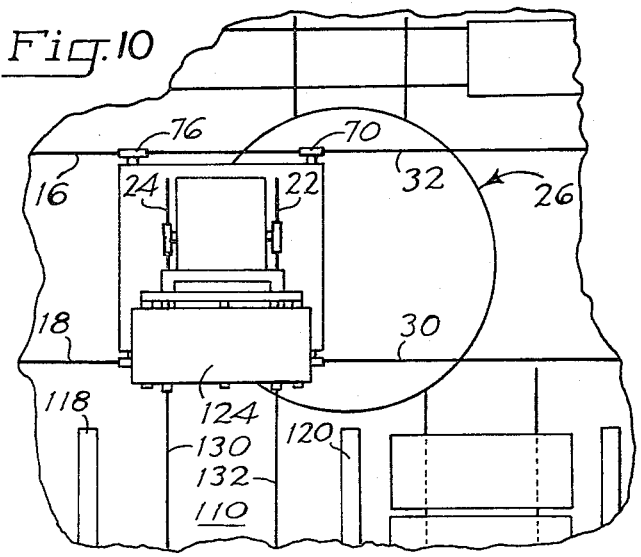
FIG. 10 is a view similar to FIG. 9 illustrating shifting of the transfer car means to a position in alignment with rails in a first kiln bay.
Figure 11:
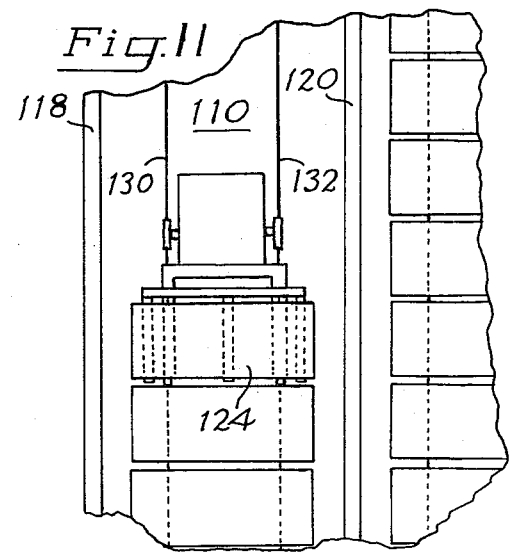
FIG. 11 is a view similar to FIG. 10 illustrating departure of the load carrier means from the transfer car means for positioning the rack in the kiln bay.

As shown in FIG. 9, turntable 26 has been rotated through a predetermined angular displacement of 180° so that laterally opposed rails 30, 32 of the turntable are now aligned with rails 18, 16, respectively of the predetermined path. As can be seen, load carrier means 20 is now positioned so that it is presented to face kiln 108 in its pre-spot position. The next step in the transferring of rack 124 may be best appreciated from a consideration of FIGS. 10–12. As shown in FIG. 10, transfer car means 14 is laterally shifted along rails 30, 32 so that a portion of the transfer car means is supported on rails 16, 18. It is to be noted that it is not necessary to completely shift transfer car means from turntable 26 because of the provision of auxiliary rail 82 as shown in FIG. 3. Elaborating further, it can be seen that auxiliary rail 82 is provided so that load carrier means 20 may be shifted onto a pair of rails 130, 132 provided in a second station such as bay 110. As shown in FIG. 11, load carrier means 20 has been shifted for departure from transfer car means 14 for positioning rack 124 adjacent other prior deposited racks. FIGS. 12 and 13 illustrate, after depositing of rack 124, return of load carrier means 20 to its pre-spot position on transfer car means 14.

The next step contemplates that other racks in the kiln, already suitably cured, may be removed to an unloading station. As shown in FIGS. 14, 15, transfer car means 20 has been laterally shifted to the right and beyond turntable 26 and a portion of turntable 28 so that it is positioned in front of a third station such as bay 116. Load carrier means 20 is suitably shifted for departure from the transfer car means so that the forks are positioned for receiving and picking up a rack of cured blocks indicated at 134. The load carrier means is then returned to its pre-spot position, and the transfer car means is laterally shifted onto turntable 28. As shown in FIG. 16, turntable 28 is suitably rotated through a predetermined angular displacement of, in this instance, 180°, so that rack 134 is presented to face a fourth station such as the rack unloader. The load carrier means is then shifted along guide means 22, 24 so that rack 134 is positioned for suitable depositing onto rack conveyor 106 which will transfer the racks to unloader 104.

As shown in FIGS. 18, 19, load carrier means 20 is returned to its pre-spot position on transfer car means 14 and shifting of the transfer car means from turntable 28 along the predetermined path to its start position on turntable 26 enables the entire process to continue. Turntable 26 has been rotated so that tracks 30, 32 are aligned with rails 16, 18 respectively prior to return of the transfer car means.

While the above description has been set forth with reference to a pair of turntables, it must be appreciated that the present invention contemplates any desired number of turntables (depending on plant size) in order to facilitate positioning of the handling means relative to loading and unloading stations and kiln bays. In addition, it must be appreciated that while the above description refers to reorienting the turntables through angular displacements of 180°, other displacements may be more practical depending upon a particular block processing plant layout. For instance, it may be desirable to effect rotation of 90° in order to properly present the load carrier means in front of a kiln. This would be the situation in which the loading and unloading stations are not positioned in generally parallel relationship to a kiln as shown in FIG. 5.

Further, from a consideration of the above description, it must be appreciated that the present invention lends itself to automation. More specifically, while specific power sources and control panels have not been illustrated, it may be recognized that control of the turntables, relative positioning of transfer car means 14 and load carrier means 20 may be automatically controlled. Each of the steps of load carrier means shifting, turntable rotation and transfer car means shifting may be automatically controlled through suitable actuation of individual power-driven means provided on each of the above components. In addition, it should be noted that complete automation of kiln operations may be effected in any predetermined order.

For instance, while FIGS. 5-19 describe operation of the apparatus with respect to the handling means first receiving a rack from an unloading station, transferring the rack to a kiln bay and then receiving a rack of cured blocks for transport to an unloading station, other variations are readily obtainable. As an example, it may be desired to initially fill up one or more of the kiln bays completely with racks. Thus, considering bay 110, it may be desirable to sequence, through suitable control means, operation of handling means 12 and turntable 26 so that the bay is filled with racks. Next, if desired, a previously filled bay may be continuously unloaded rack by rack, and each rack sequentially presented to the unloading station. The important point to remember is that the apparatus and method of the present invention may be automatically controlled so that any desired sequence of loading and unloading may be achieved.

Additionally, another advantage of the present invention resides in the shiftability of load carrier means 20 relative to transfer car means 14. More specifically, it can be seen from a consideration of FIG. 5 that it is necessary for load carrier means 20 to be shiftable, relative to transfer car means 14, so that a load from a loading station may be received. Return of load carrier means 20, with a load provided thereon, to a relatively central or pre-spot position on transfer car means 14 is necessary so that turntable 26 may be suitably rotated through a predetermined angular displacement. Of course, it is also necessary that transfer car means 14 is shiftable relative to turntable 26 so that the transfer car means may be presented to a different station such as a selected kiln bay. Necessarily, load carrier means 20 is shiftable for total departure from transfer car means 14 so that the racks may be positioned at locations disposed substantially away from the predetermined path. Thus, relative shiftability of the load carrier means and transfer car means as well as relative shiftability of the transfer car means along a predetermined path from a turntable are important features of the present invention.

Figure 2:
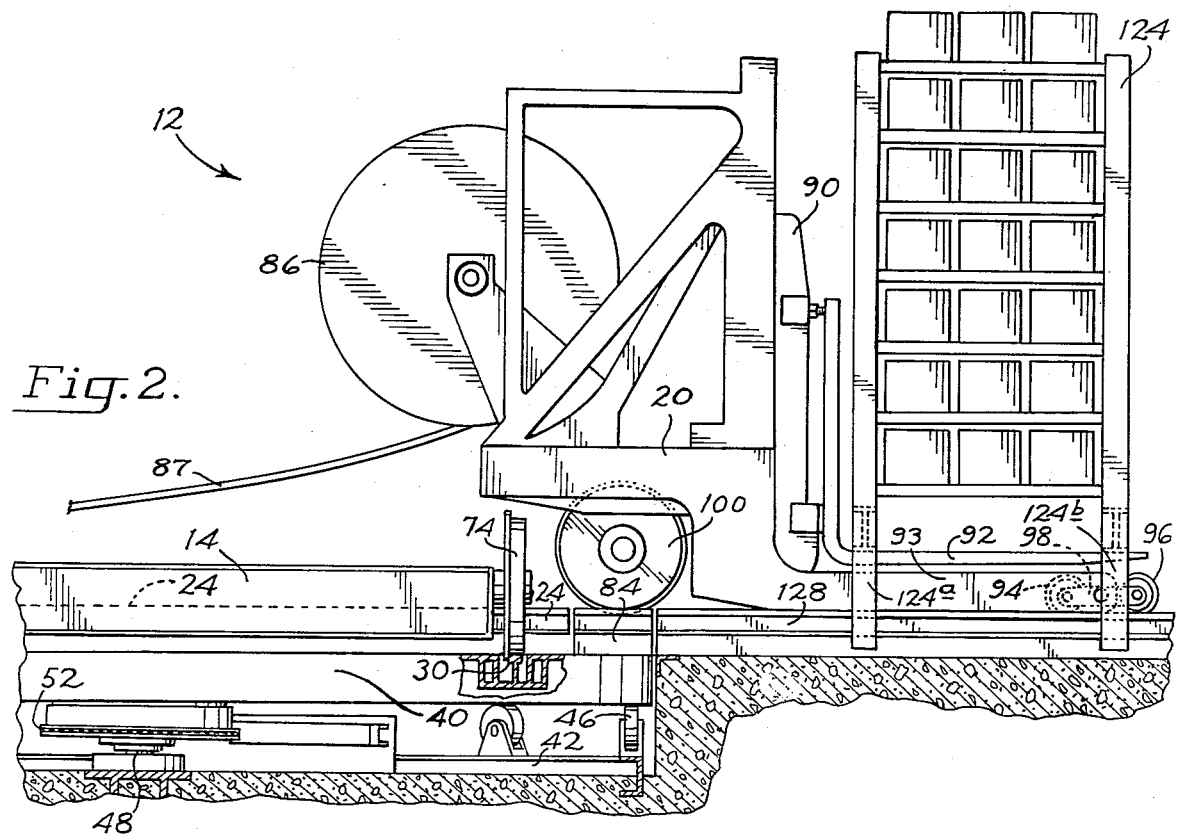
FIG. 2 is a view similar to FIG. 1 illustrating shifting of the load carrier means relative to the transfer car means so that a load may be transferred to a kiln bay or other station.

Another significant feature of the present invention is the utilization of a forklift vehicle as the load carrier means. While forklift vehicles are known in the material handling art, it must be appreciated that the provision of such a vehicle mounted on guide means provided on transfer car means 14 is preferable for picking up and depositing a load or rack. In addition, by providing the forwardly extending stabilizing members (one of which is illustrated in FIG. 2 at 93) the necessity for a counterweight is eliminated. Because there must be some clearance between the outer circumference of upper section 40 and the rails extending into a selected kiln bay to permit rotation, provision of rockable wheel pairs positioned in tandem facilitates transfer of the forklift vehicle onto the kiln rails. It is also contemplated that rails may be provided in selected kiln bays which extend directly toward rail 18 of the predetermined path. For instance, as shown in FIG. 5, a pair of rails 136, 138 provided in bay 116 extend directly to a position adjacent rail 18 of the predetermined path. Further, additional bays either to the right or left of FIG. 5 may be provided which extend directly to rail 18 of the predetermined path.

Still another feature of the present invention resides in the provision of turntables, as described above, which utilize relatively rotatable upper and lower sections wherein the upper section is driven by power-driven means as illustrated in FIG. 4. By providing fluid actuated means including extendible-retractable means operable in opposition to one another, selective rotation of the upper section of each turntable may be effected. Of course, by suitable positioning of the extendible-retractable means with respect to the total distance to which they may be extended, orientation or rotation of a turntable through any predetermined angular displacement may be provided.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:

1. Apparatus for transferring a load between selected stations comprising:

transfer car means operable for selective shifting along a first predetermined path interposed between first and second stations;

orienting means positioned adjacent and fixed relative to said first predetermined path operable for selective rotation through a predetermined angular displacement, said orienting means including turntable means and power-driven means coupled thereto, said power-driven means being operable for angularly displacing said turntable means about a substantially vertical axis of rotation, said turntable means also including track means selectively alignable with said first predetermined path upon suitable positioning of said turntable means for receiving said transfer car means thereon; and load carrier means operable for picking up and depositing a load, said load carrier means being mounted on and powered from said transfer car means and operable for reciprocative shifting thereon from a pre-spot position to load receiving and depositing positions, said load carrier means also being shiftable to positions remote from said transfer car means for selective positioning along a second predetermined path.

2. The apparatus of claim 1 wherein said predetermined path extends outwardly from at least one side of said turntable means so that when said track means are aligned with said first predetermined path, said transfer car means may be shifted for arrival onto said orienting means or shifted for departure therefrom.

3. The apparatus of claim 2 wherein said transfer car means includes guide means for receiving said load carrier means, said guide means being alignable, upon shifting of said transfer car means with corresponding, alignable guide means in a selected station for enabling said load carrier means to be selectively shifted away from said transfer car means and subsequently returned thereto.

4. The apparatus of claim 3 wherein said turntable means includes auxiliary track means, positioned at an angle relative to said first track means, for receiving said load carrier means.

5. The apparatus of claim 1 wherein said turntable means includes a circular upper section rotatably mounted above a stationary lower section, wheel means being interposed between said upper and lower sections for facilitating relative rotatable movement therebetween, said track means being mounted on said upper section.

6. The apparatus of claim 5 wherein said power driven means includes power transmission means coupled thereto and coaxially aligned with said axis of rotation, said power transmission means being coupled to fluid actuated means.

7. The apparatus of claim 6 wherein said fluid actuated means includes a pair of extendible-retractable means mounted on opposite sides of said power transmission means and coupled thereto operable for extension and retraction in opposition to one another for imparting rotation in a like sense to said transmission means and said upper section.

8. The apparatus of claim 7 wherein said power transmission means includes wheel means coupled by means of a flexible drive to said extendible-retractable means.

9. The apparatus of claim 3 wherein said load carrier means is a forklift vehicle operable for raising and lowering a load by means of a mast assembly.

10. The apparatus of claim 9 wherein said forklift vehicle includes stabilizing members extending forwardly from said mast assembly.

11. The apparatus of claim 10 wherein said stabilizing members are mounted on said guide means by means of tandem wheel pairs.

12. Apparatus for transferring selected loads between selected stations comprising:
transfer car means operable for selective shifting along a first predetermined path interposed between stations;
load carrier means including a forklift vehicle having a mast assembly, said load carrier means being mounted on and powered from said transfer car means and operable for reciprocative shifting relative to said transfer car means and from a pre-spot position to load receiving and depositing positions; and
a pair of spaced-apart turntable means having power-driven means coupled thereto positioned adjacent and fixed relative to said first predetermined path, each turntable means being operable for selective rotation through a predetermined angular displacement about a substantially vertical axis of rotation and each including a pair of laterally opposed track means selectively alignable with said first predetermined path upon suitable positioning of said turntable means, said transfer car means being operable for transfer from one of said turntable means to the other along said first predetermined path, said load carrier means also being shiftable to positions remote from said transfer car means for selective positioning along a second predetermined path.

13. The apparatus of claim 12 wherein said transfer car means includes guide means for receiving said load carrier means, said guide means being alignable upon shifting of said transfer car means with corresponding alignable guide means in a selected station for enabling said load carrier means to be selectively shifted away from said transfer car means and subsequently returned thereto.

14. The apparatus of claim 13 wherein said turntable means includes auxiliary track means positioned at an angle relative to said first track means for receiving said load carrier means.

15. The apparatus of claim 12 wherein said turntable means includes a circular upper section rotatably mounted above a stationary lower section, wheel means being interposed between said upper and lower sections for facilitating relative rotatable movement therebetween, said track means being mounted on said upper section.

16. The apparatus of claim 15 wherein said power-driven means includes power transmission means coupled thereto and coaxially aligned with said axis of rotation, said power transmission means being coupled to fluid actuated means.

17. The apparatus of claim 16 wherein said fluid actuated means includes a pair of extendible-retractable means mounted on opposite sides of said transmission means and coupled thereto and operable for extension and retraction in opposition to one another for imparting rotation in a like sense to said power transmission means and said upper section.

18. The apparatus of claim 17 wherein said power transmission means includes wheel means coupled by means of a flexible drive to said extendible-retractable means.

19. The apparatus of claim 14 wherein said forklift vehicle includes stabilizing members extending forwardly from said mast assembly.

20. The apparatus of claim 19 wherein said stabilizing members are mounted on said guide means by means of tandem wheel pairs.

* * * * *